United States Patent
Goncalves et al.

(10) Patent No.: US 11,702,531 B2
(45) Date of Patent: Jul. 18, 2023

(54) ELASTOMER COMPOSITION COMPRISING A FILLER AT LEAST PARTIALLY COVERED BY SILICA

(71) Applicant: COMPAGNIE GENERALE DES ETABLISSEMENTS MICHELIN, Clermont-Ferrand (FR)

(72) Inventors: Olivier Goncalves, Clermont-Ferrand (FR); Cécile Belin, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 882 days.

(21) Appl. No.: 16/062,354

(22) PCT Filed: Dec. 15, 2016

(86) PCT No.: PCT/FR2016/053454
§ 371 (c)(1),
(2) Date: Jul. 28, 2020

(87) PCT Pub. No.: WO2017/103495
PCT Pub. Date: Jun. 22, 2017

(65) Prior Publication Data
US 2020/0399442 A1    Dec. 24, 2020

(30) Foreign Application Priority Data

Dec. 17, 2015 (FR) ...................................... 1562570

(51) Int. Cl.
*C08K 9/10* (2006.01)
*B60C 1/00* (2006.01)
*C08K 3/04* (2006.01)
*C08K 3/36* (2006.01)

(52) U.S. Cl.
CPC .............. *C08K 9/10* (2013.01); *B60C 1/0016* (2013.01); *C08K 3/04* (2013.01); *C08K 3/36* (2013.01); *B60C 2200/06* (2013.01); *C08K 2201/014* (2013.01)

(58) Field of Classification Search
CPC ... C08K 9/10; C08K 3/04; C08K 3/36; C08K 2201/019; C08K 9/02; B60C 1/0016; B60C 2200/06; C08J 2307/02; C08J 2309/08; C08J 2309/10; C08J 3/2053; C08J 3/215
USPC .......................................................... 523/209
See application file for complete search history.

(56) References Cited

U.S. PATENT DOCUMENTS

| | | | |
|---|---|---|---|
| 6,048,923 A | 4/2000 | Mabry | |
| 9,751,992 B2 * | 9/2017 | Sevignon | ................ C08K 3/04 |
| 10,059,833 B2 * | 8/2018 | Sevignon | ................ C08J 3/215 |
| 2016/0319112 A1 | 11/2016 | Vallat et al. | |
| 2022/0282070 A1 * | 9/2022 | Lagarde | ................... C08L 7/02 |

FOREIGN PATENT DOCUMENTS

| | | |
|---|---|---|
| FR | 3003864 A1 | 10/2014 |
| WO | 2015/091270 A1 | 6/2015 |

OTHER PUBLICATIONS

International Search Report for PCT/FR2016/053454 dated Jun. 22, 2017.

* cited by examiner

*Primary Examiner* — Hannah J Pak
(74) *Attorney, Agent, or Firm* — Dickinson Wright PLLC; Steven C. Hurles

(57) ABSTRACT

A rubber composition based on at least one diene elastomer, a reinforcing filler predominantly comprising a filler covered at least partially by silica and a crosslinking system. The dispersion of the filler in the elastomeric matrix has a Z score greater than or equal to 70, and the composition is devoid of agent for coupling the filler with the elastomer.

16 Claims, No Drawings

ELASTOMER COMPOSITION COMPRISING A FILLER AT LEAST PARTIALLY COVERED BY SILICA

CROSS-REFERENCE TO RELATED APPLICATION

The present application claims priority to PCT International Patent Application Serial No. PCT/FR2016/053454, filed Dec. 15, 2016, entitled "ELASTOMER COMPOSITION COMPRISING A FILLER AT LEAST PARTIALLY COVERED BY SILICA," which claims the benefit of FR Patent Application Serial No. 1562570, filed Dec. 17, 2015.

BACKGROUND OF THE INVENTION

1. Field of the Invention

The disclosure relates to a rubber composition, especially for a tire tread and more particularly for a tire intended to equip vehicles carrying heavy loads and running at sustained speed, such as, for example, lorries, tractors, trailers or buses, aircraft, etc.

2. Related Art

Some current tires, referred to as "road" tires, are intended to run at high speed and over increasingly long journeys, as a result of the improvement in the road network and of the growth of the motorway network throughout the world. Yet, since savings in fuel and the need to protect the environment have become a priority, it is important for the tires to have a low energy consumption. One of the sources of energy dissipation is the heating of the tire.

Likewise, it is known that the treads of the tires used in civil engineering are particularly sensitive to the increase in temperature. There is a constant search to improve the properties of tires and in particular their wear resistance and, conventionally, the improvement in the wear resistance is known to be reflected by an increase in energy consumption.

It is known that, in order to obtain the optimum reinforcing properties imparted by a filler in a tire tread, and thus to obtain high wear resistance, it is generally advisable for this filler to be present in the elastomeric matrix in a final form that is both as finely divided as possible and as uniformly distributed as possible. However, such conditions can be achieved only if this filler has a very good ability, on the one hand, to be incorporated into the matrix during the mixing with the elastomer and to deagglomerate, and, on the other hand, to disperse uniformly in this matrix.

In a known way, carbon black has such abilities, which is not generally the case with inorganic fillers, in particular silicas. This is because, for reciprocal affinity reasons, these inorganic filler particles have an unfortunate tendency to clump together in the elastomeric matrix. These interactions have the harmful consequence of limiting the dispersion of the filler and thus the reinforcing properties to a level substantially lower than it would theoretically be possible to achieve if all the (inorganic filler/elastomer) bonds capable of being created during the compounding operation were actually obtained. These interactions moreover tend to increase the consistency in the raw state of the rubber compositions and thus to make their processability more difficult than in the presence of carbon black.

There is therefore a need to have a filler, providing the hysteresis level of silica and the reinforcing character of a filler such as carbon black, in rubber compositions.

This is why reinforcing fillers covered at least partially by silica are particularly beneficial, in particular reinforcing fillers consisting of carbon black covered at least partially by silica, such as described, especially, in the publications WO98/13428 and EP 711 805 B1, or reinforcing fillers consisting of metal oxide covered at least partially by silica such as described, especially, in the publication FR2888243.

The advantage of using fillers covered at the surface by a silica, especially with a high specific surface area, lies mainly in the possibility of increasing the number of bonds of the silica with the elastomer and therefore of increasing the level of reinforcement thereof.

This is why it appears to be advantageous to use, in rubber compositions for tire treads, reinforcing fillers covered by silicas, especially by silica with a high specific surface area, optionally greater than that conventionally used of the order of 160 $m^2/g$, especially in order to improve the wear resistance of these treads. Nonetheless, the dispersibility of the filler and the increase in its specific surface area are considered to be contradictory characteristics. This is because a large specific surface area implies an increase in the interactions between filler objects, and therefore a poor dispersion of said filler in the elastomeric matrix, as well as a poor processability. The problem of dispersibility of a filler covered at least partially by silica is related to that of the dispersibility of the silica itself.

There are various methods for obtaining a masterbatch of diene elastomer and of reinforcing filler. In particular, one type of solution consists, in order to improve the dispersibility of the filler in the elastomeric matrix, in compounding the elastomer and the filler in the "liquid" phase. To do this, use is made of an elastomer in the form of latex which is in the form of elastomer particles dispersed in water, and of an aqueous dispersion of the filler, i.e. a filler dispersed in water, commonly referred to as a "slurry". Certain processes in particular, such as those described in U.S. Pat. No. 6,048,923, make it possible to obtain a masterbatch of elastomer and filler that has very good dispersion of the filler in the elastomeric matrix, greatly improved compared to the dispersion of the filler in the elastomeric matrix that may be obtained during the solid-phase compounding of elastomer and reinforcing filler. This process consists especially in incorporating a continuous stream of a first fluid formed by an elastomer latex into the compounding region of a coagulation reactor, in incorporating a second continuous stream of a second fluid formed by an aqueous dispersion of filler under pressure into the compounding region to form a mixture with the elastomer latex; the compounding of these two fluids being sufficiently energetic to make it possible to almost completely coagulate the elastomer latex with the filler before the outlet orifice of the coagulation reactor, and then in drying the coagulum obtained.

Thus, several publications, especially document WO2012/037244, disclose the use of reinforcing fillers covered at least partially by silica, in masterbatches based on natural rubber produced in the liquid phase and comprising in particular a coupling agent, also referred to as bonding agent, the role of which is to provide bonding between the surface of the particles of inorganic filler and the elastomer, while facilitating the dispersion of this inorganic filler within the elastomeric matrix.

The term "masterbatch" is understood to mean, in that which follows: an elastomer-based composite into which a filler and optionally other additives have been introduced.

SUMMARY OF THE INVENTION AND ADVANTAGES

The applicant has discovered, surprisingly, that compositions based on diene elastomer and on filler covered at least partially by silica, and having a very good dispersion of the reinforcing filler in the elastomeric matrix, especially obtained by a step of liquid-phase compounding, had improved reinforcing properties without deterioration of the hysteresis properties, without containing coupling agent, contrary to the knowledge of those skilled in the art.

Thus, a subject of the disclosure is a rubber composition based on at least one diene elastomer, a reinforcing filler predominantly comprising a filler covered at least partially by silica and a crosslinking system, wherein the dispersion of the filler in the elastomeric matrix has a Z score greater than or equal to 70 and wherein the composition is devoid of agent for coupling the filler with the elastomer.

According to a preferential variant of the disclosure, the filler covered at least partially by silica is chosen from carbon black, metal hydroxides, especially magnesium or aluminium hydroxides, and crosslinked polymer particles; more preferentially, the filler covered at least partially by silica consists of carbon black.

Advantageously, the diene elastomer is selected from the group consisting of polybutadienes, natural rubber, synthetic polyisoprenes, butadiene copolymers, isoprene copolymers and the mixtures of these elastomers; more preferably, the diene elastomer is a natural rubber.

According to another preferential variant embodiment of the disclosure, the composition comprises less than 15 phr of plasticizing agents, preferably less than 5 phr.

The disclosure also relates to a process for preparing a composition based on at least one diene elastomer, a reinforcing filler predominantly comprising a filler covered at least partially by silica and a crosslinking system, the dispersion of the filler in the elastomeric matrix being a Z score greater than or equal to 70 and the composition being devoid of agent for coupling the filler with the elastomer:

preparing a masterbatch comprising the diene elastomer and the filler covered at least partially by silica, this first masterbatch exhibiting a dispersion of the filler in the elastomeric matrix having a Z score of greater than or equal to 70, incorporating the other constituents of the composition, with the exception of the crosslinking system, into the first masterbatch in a mixer, everything being kneaded thermomechanically until a maximum temperature of between 130° C. and 200° C. is reached, cooling the combined mixture to a temperature of less than 100° C., subsequently incorporating the crosslinking system, kneading everything up to a maximum temperature of less than 120° C.

Finally, the disclosure relates to a finished or semi-finished article comprising a composition as mentioned above, a tread comprising such a composition and a tire or semi-finished product comprising such a composition, especially a tire intended to equip vehicles carrying heavy loads and running at sustained speed.

I.—Measurements and Tests

The rubber compositions are characterized, before and after curing, as indicated below.

Dispersion

In a known way, the dispersion of filler in an elastomeric matrix can be represented by the Z score, which is measured, after crosslinking, according to the method described by S. Otto et al. in Kautschuk Gummi Kunststoffe, 58 Jahrgang, NR July-August 2005, in agreement with standard ISO 11345.

The calculation of the Z score is based on the percentage of surface area in which the filler is not dispersed ("% undispersed surface area"), as measured by the "disper-GRADER+" device supplied, with its operating instructions and "disperDATA" operating software, by Dynisco, according to the equation:

$$Z=100-(\% \text{ undispersed surface area})/0.35$$

The percentage of undispersed surface area is, for its part, measured by virtue of a camera which observes the surface of the sample under incident light at 30°. The light points are associated with filler and agglomerates, whereas the dark points are associated with the rubber matrix; digital processing converts the image into a black and white image, and allows the percentage of undispersed surface area to be determined as described by S. Otto in the abovementioned document.

The higher the Z score, the better the dispersion of the filler in the elastomeric matrix (a Z score of 100 corresponding to a perfect dispersion and a Z score of 0 to a mediocre dispersion). A Z score of greater than or equal to 80 will be regarded as corresponding to a surface having very good dispersion of the filler in the elastomeric matrix.

Tensile Tests

These tensile tests make it possible to determine the elasticity stresses and the properties at break. Unless otherwise indicated, they are carried out in accordance with French Standard NF T 46-002 of September 1988. At second elongation (i.e. after an accommodation cycle at the extension rate provided for the measurement itself), the nominal secant modulus (or apparent stress, in MPa) is measured at 100% elongation (denoted by MA100) and 300% elongation (denoted by MA300). The tensile measurements for determining the secant accommodated moduli are carried out at a temperature of 23° C.+/−2° C., and under standard hygrometry conditions (50+/−5% relative humidity).

The stresses at break (in MPa) and the elongations at break (in %) are also measured. All these tensile measurements are carried out at a temperature of 60° C.±2° C. and under standard hygrometry conditions (50±5% relative humidity), according to French Standard NF T 40-101 (December 1979).

Dynamic Properties

The dynamic properties, including tan(δ)max, are measured on a viscosity analyser (Metravib V A4000) according to Standard ASTM D 5992-96. The response of a sample of vulcanized composition (cylindrical test specimen with a thickness of 4 mm and a cross section of 400 mm$^2$), subjected to a simple alternating sinusoidal shear stress, at a frequency of 10 Hz, under the standard temperature conditions according to Standard ASTM D 1349-99, is recorded. A peak-to-peak strain amplitude sweep is carried out from 0.1% to 50% (outward cycle) and then from 50% to 0.1% (return cycle). The result made use of is the loss factor tan(δ). For the return cycle, the maximum value of tan(δ) observed (tan(δ)max) is indicated. The tan(δ)max values given below are measured at 100° C.

DETAILED DESCRIPTION OF THE ENABLING EMBODIMENT

The disclosure relates to a rubber composition based on at least one diene elastomer, a reinforcing filler predominantly comprising a filler covered at least partially by silica and a crosslinking system, wherein the dispersion of the filler in the elastomeric matrix has a Z score greater than or equal to 70 and wherein the composition is devoid of agent for coupling the filler with the elastomer.

In the present description, unless expressly indicated otherwise, all the percentages (%) shown are % by weight. Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b).

Diene Elastomer

As is customary, the terms "elastomer" and "rubber", which are interchangeable, are used without distinction in the text.

The composition in accordance with the disclosure comprises at least one first diene elastomer and optionally a second elastomer identical to or different from the first, which thus may or may not be a diene elastomer.

A "diene" elastomer or rubber should be understood, in a known way, as meaning an elastomer resulting at least in part (i.e., a homopolymer or a copolymer) from diene monomers (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be described as "essentially saturated" diene elastomers (low or very low content, always less than 15%, of units of diene origin). In the category of "essentially unsaturated" diene elastomers, "highly unsaturated" diene elastomer is understood in particular to mean a diene elastomer having a content of units of diene origin (conjugated dienes) which is greater than 50%.

Among these diene elastomers, a distinction is furthermore made between natural rubber and synthetic elastomers.

In the expression "synthetic diene elastomers capable of being used in accordance with the disclosure", the term "diene elastomer" is intended more particularly to mean:

(a)—any homopolymer obtained by polymerization of a conjugated diene monomer having from 4 to 12 carbon atoms;
(b)—any copolymer obtained by copolymerization of one or more conjugated dienes with one another or with one or more vinylaromatic compounds having from 8 to 20 carbon atoms;
(c)—a ternary copolymer obtained by copolymerization of ethylene, of an α-olefin having from 3 to 6 carbon atoms with a non-conjugated diene monomer having from 6 to 12 carbon atoms, such as, for example, the elastomers obtained from ethylene, and of propylene with a non-conjugated diene monomer of the abovementioned type, such as, especially, 1,4-hexadiene, ethylidene norbornene or dicyclopentadiene;
(d)—a copolymer of isobutene and of isoprene (butyl rubber) and also the halogenated versions, in particular chlorinated or brominated versions, of this type of copolymer.

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. Mention may for example be made, for coupling to carbon black, of functional groups comprising a C—Sn bond or aminated functional groups, such as aminobenzophenone, for example; mention may for example be made, for coupling to an inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are especially suitable.

To summarize, the synthetic diene elastomer(s) according to the disclosure are preferentially selected from the group of highly unsaturated diene elastomers formed by polybutadienes (abbreviated to BRs), synthetic polyisoprenes (IRs), butadiene copolymers, isoprene copolymers and the mixtures of these elastomers. Such copolymers are more preferentially selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

As was specified above, liquid-phase compounding processes are preferentially used to make it possible to obtain masterbatches based on diene elastomer and on reinforcing filler that have a very good dispersion of the reinforcing filler in the elastomer. Thus, especially for the preparation of the masterbatch of diene elastomer and filler covered at least partially by silica, use will more particularly be made of a diene elastomer latex, the elastomer latex being a particular form of the elastomer which exists in the form of water-dispersed elastomer particles.

The disclosure thus preferentially relates to latices of diene elastomers, the diene elastomers being those defined previously.

More particularly, for natural rubber (NR), which is particularly suitable for use in the disclosure, this natural rubber exists in various forms, as explained in detail in Chapter 3, "Latex concentrates: properties and composition", by K. F. Gaseley, A. D. T. Gordon and T. D. Pendle in "Natural Rubber Science and Technology", A. D. Roberts, Oxford University Press-1988.

In particular, several forms of natural rubber latex are sold: the natural rubber latices referred to as "field latices", the natural rubber latices referred to as "concentrated natural rubber latices", epoxidized latices (ENRs), deproteinized latices or else prevulcanized latices. Natural rubber field latex is a latex to which ammonia has been added in order to prevent premature coagulation and concentrated natural rubber latex corresponds to a field latex which has undergone a treatment corresponding to a washing, followed by a further concentration. The various categories of concentrated natural rubber latices are listed in particular according to Standard ASTM D 1076-06. Singled out in particular among these concentrated natural rubber latices are the concentrated natural rubber latices of the grade referred to as: "HA" (high ammonia) and of the grade referred to as "LA"; for the disclosure, use will advantageously be made of concentrated natural rubber latices of HA grade.

The NR latex can be physically or chemically modified beforehand (centrifugation, enzymatic treatment, chemical modifier, etc.).

The latex can be used directly or be diluted beforehand in water to facilitate the use thereof.

Thus, as synthetic elastomer latex, the latex may especially consist of a synthetic diene elastomer already available in the form of an emulsion (for example, a butadiene/styrene copolymer, SBR, prepared in emulsion) or consist of a synthetic diene elastomer initially in solution (for example, an SBR prepared in solution) which is emulsified in a mixture of organic solvent and water, generally by means of a surfactant.

A latex of SBR, especially an SBR prepared in emulsion ("ESBR") or an SBR prepared in solution ("SSBR"), and more particularly an SBR prepared in emulsion, is particularly suitable for the disclosure.

There are two main types of processes for the emulsion copolymerization of styrene and butadiene, one of them, also known as hot process (carried out at a temperature close to 50° C.), being suitable for the preparation of highly branched SBRs, whereas the other, also known as cold process (carried out at a temperature which can range from 15° C. to 40° C.), makes it possible to obtain more linear SBRs.

For a detailed description of the effectiveness of several emulsifiers which can be used in said hot process (as a function of the contents of said emulsifiers), reference may be made, for example, to the two papers by C. W. Carr, I. M. Kolthoff, E. J. Meehan, University of Minnesota, Minneapolis, Minn. which appeared in the Journal of Polymer Science of 1950, Vol. V, no. 2, pp. 201-206, and of 1951, Vol. VI, no. 1, pp. 73-81.

Regarding comparative exemplary embodiments of said cold process, reference may be made, for example, to the paper in Industrial and Engineering Chemistry, 1948, Vol. 40, no. 5, pp. 932-937, E. J. Vandenberg, G. E. Hulse, Hercules Powder Company, Wilmington, Del. and to the paper in Industrial and Engineering Chemistry, 1954, Vol. 46, no. 5, pp. 1065-1073, J. R. Miller, H. E. Diem, B. F. Goodrich Chemical Co., Akron, Ohio.

In the case of an SBR (ESBR or SSBR) elastomer, use is especially made of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1, 4-bonds.

It should be noted that it is possible to envisage using one or more natural rubber latices as a blend, one or more synthetic rubber latices as a blend, or a blend of one or more natural rubber latices with one or more synthetic rubber latices.

According to a variant embodiment of the disclosure, the composition comprises a second elastomer which may or may not be a diene elastomer; in the latter case, the following are particularly suitable: non-diene butyl elastomers such as poly(isobutylene) homopolymers or copolymers based on poly(isobutylene) (of course, when it is a question of copolymers with isoprene, the diene elastomers described above are recalled), and also the halogenated derivatives, in particular generally brominated or chlorinated derivatives, of these poly(isobutylene) homopolymers and copolymers based on poly(isobutylene). Among the non-diene elastomers, copolymers of isobutylene and of styrene derivatives, such as brominated isobutylene/methylstyrene (BIMS) copolymers, among which especially is the elastomer named Exxpro sold by Exxon, are also suitable.

Mention may also be made, as non-diene elastomer particularly suitable for the disclosure, of non-diene thermoplastic elastomers (TPEs).

Advantageously, the fraction by weight of the first diene elastomer in the elastomeric matrix is greater than or equal to 50% and preferably greater than or equal to 60%.

Fillers

As reinforcing filler, predominantly any filler covered at least partially by silica is used. Thus, the filler covered at least partially by silica may in particular consist of a carbon black, metal hydroxides, especially magnesium or aluminium hydroxides, and crosslinked polymer particles.

The carbon blacks covered partially or completely by silica by a post-treatment, or the carbon blacks modified in situ by silica such as, non-limitingly, the fillers sold by Cabot Corporation under the name Ecoblack™ CRX 2000 or CRX4000, or the fillers described in publications US2003040553 and WO9813428, are particularly suitable.

Such a reinforcing filler preferentially contains a content of silica of 10% by weight of the reinforcing filler.

Such fillers may be obtained according to the method for covering carbon black by silica as described in examples 1 and 2 of patent application WO00/05312.

Synthetic metal hydroxides covered by silica, the metal M of which is selected from the group consisting of Al, Fe, Mg, and mixtures of these metals, are also particularly suitable. M preferably represents Al or Mg as described especially in publications WO06/002993 or WO07/003408.

This filler covered at least partially by silica may advantageously constitute more than 60% of the total reinforcing filler.

It may be used alone or in a blend with another organic filler such as carbon black or functionalized polyvinylaromatic organic fillers such as described in applications WO-A-2006/069792 and WO-A-2006/069793, and/or one or more reinforcing inorganic fillers such as silica and/or another filler covered at least partially by silica.

All carbon blacks, especially blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772).

"Reinforcing inorganic filler" should be understood, in the present application, by definition, as meaning any inorganic or mineral filler (regardless of its colour and its origin, natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica (Sift), or of the aluminous type, in particular alumina ($Al_2O_3$), are especially suitable as reinforcing inorganic fillers. The silica used can be any reinforcing silica known to those skilled in the art, especially any precipitated or fumed silica having a BET surface area and a CTAB specific surface area which are both less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

The filler covered at least partially by silica preferably represents more than 90% of the reinforcing filler.

According to a variant embodiment of the disclosure, the filler covered at least partially by silica constitutes the only reinforcing filler of the composition.

Preferentially, the content of total reinforcing filler is between 20 and 200 phr, more preferentially between 30 and 150 phr and more preferentially still between 30 and 100 phr, the optimum being, in a known way, different depending on the particular applications targeted: the level of reinforcement expected with regard to a bicycle tire, for example, is of course less than that required with regard to a tire capable of running at high speed in a sustained manner, for example a motorcycle tire, a tire for a passenger vehicle or a tire for a utility vehicle, such as a heavy duty vehicle.

According to a preferential embodiment of the disclosure, use is made, as reinforcing filler covered at least partially by silica, of carbon black covered at least partially by silica at a content ranging from 30 to 90 phr, and this can preferably be combined with an organic filler, in particular carbon black, or inorganic filler, in particular silica, the content of which ranges from 1 to 50 phr, more particularly the total filler of the composition comprising carbon black covered at least partially by silica, the content of which ranges from 35 to 75 phr and an organic filler, in particular carbon black, or an inorganic filler, in particular silica, the content of which ranges from 1 to 35 phr, even more preferentially the total filler comprising carbon black covered at least partially by silica, the content of which ranges from 40 to 65 phr and an organic filler, in particular carbon black, or an inorganic filler, in particular silica, the content of which ranges from 1 to 20 phr.

According to another preferential variant of the disclosure, the composition solely comprises carbon black covered at least partially by silica at a content ranging from 30 to 90 phr, and more preferentially the content ranges from 35 to 75 phr.

The composition in accordance with the disclosure does not comprise coupling agent.

Other Possible Additives

The rubber compositions in accordance with the disclosure optionally also comprise all or a portion of the normal additives customarily used in elastomer compositions intended especially for the manufacture of treads, such as, for example, pigments, protective agents, such as antiozone waxes, chemical antiozonants or antioxidants, anti-fatigue agents, reinforcing resins, or methylene acceptors (for example novolac phenolic resin) or donors (for example HMT or H3M).

According to a preferential embodiment, the composition according to the disclosure comprises less than 15 phr of plasticizing agents, preferably less than 5 phr, and even more preferentially, the composition does not contain any plasticizing agents. The plasticizing agents conventionally used in such compositions are solid hydrocarbon-based resins (or plasticizing resin), extender oils (or plasticizing oil), or the mixture of the two.

Crosslinking System

The crosslinking system is preferably a vulcanization system, i.e. a system based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), are added to this base vulcanization system, being incorporated during the non-productive first phase and/or during the productive phase, as described subsequently.

The sulfur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

Use may be made, as (primary or secondary) accelerator, of any compound capable of acting as accelerator for the vulcanization of diene elastomers in the presence of sulfur, especially accelerators of thiazole type, and also their derivatives, and accelerators of thiuram and zinc dithiocarbamate types. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazoles=ulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds. Use is preferably made of a primary accelerator of the sulfenamide type.

Manufacture of the Rubber Compositions and Masterbatches

The rubber compositions of the disclosure are manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated.

According to a preferential embodiment of the disclosure, all the base constituents of the compositions of the disclosure, with the exception of the vulcanization system, are intimately incorporated, by kneading, during the first "non-productive" phase, that is to say that at least these various base constituents are introduced into the mixer and are thermomechanically kneaded, in one or more steps, until the maximum temperature of between 130° C. and 200° C., preferably of between 145° C. and 185° C., is reached.

According to a preferential embodiment of the disclosure, the diene elastomer and the filler covered at least partially by silica are mixed with the base constituents of the compositions of the disclosure, with the exception of the vulcanization system, in the form of a masterbatch which was prepared beforehand.

Preferentially, this masterbatch is produced in the "liquid" phase. To do this, use is made of the diene elastomer in the form of latex which is in the form of elastomer particles dispersed in water, and of an aqueous dispersion of the filler covered at least partially by silica, i.e. a filler dispersed in water, commonly referred to as a "slurry". More preferentially, the steps of the process described in U.S. Pat. No. 6,048,923 will be followed, which process consists especially in incorporating a continuous stream of a first fluid formed by the elastomer latex into the compounding region of a coagulation reactor defining an elongated coagulation region extending between the compounding region and an outlet orifice, in incorporating a second continuous stream of a second fluid formed by the aqueous dispersion of the filler under pressure into the compounding region to form a mixture with the elastomer latex; the compounding of these two fluids being sufficiently energetic to make it possible to almost completely coagulate the elastomer latex with the filler before the outlet orifice of the coagulation reactor, and then in drying the coagulum obtained.

It should in particular be noted that, in the case of the incorporation of a second elastomer and/or of a second organic or inorganic filler, this or these incorporations can be carried out simultaneously with the introduction into the mixer of the other constituents (especially the masterbatch) but also advantageously that this or these incorporations can be offset in time from a few tens of seconds to a few minutes.

It should be noted that, in the case of an addition of an organic or inorganic filler and a second elastomer, these can be introduced separately or in the form of a second masterbatch containing the second elastomer and the organic or inorganic filler. In the case of introduction of the second elastomer alone and the organic or inorganic filler alone, offset in time from a few tens of seconds to a few minutes, the organic or inorganic filler can be introduced before, after or simultaneously with the second elastomer.

By way of example, the first (non-productive) phase is carried out in a single thermomechanical step during which all the necessary constituents (if appropriate in the form of a masterbatch as specified above) and various other additives, with the exception of the vulcanization system, are introduced into an appropriate mixer, such as a standard internal mixer. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The final composition thus obtained is subsequently calendered, for example in the form of a sheet or of a slab, especially for laboratory characterization, or else extruded in the form of a rubber profiled element which can be used, for example, as a tire tread for a passenger vehicle, heavy duty vehicle, etc.

Preparation of the Rubber Compositions

The control compositions TM are produced according to a conventional compounding process (described below) in solid form, in which the elastomer, natural rubber, and the reinforcing filler, carbon black N234 sold by Cabot Corporation, and Ultrasil 7000 precipitated silica sold by Evonik, or carbon black covered by CRX2125 silica sold by Cabot Corporation, are introduced in solid form.

The control rubber compositions TA not in accordance with the disclosure and the compositions CA in accordance with the disclosure are produced according to the compounding process described below but in which the elastomer, natural rubber, and the reinforcing filler, carbon black covered by CRX2125 silica, were prepared beforehand in the form of a masterbatch A.

The masterbatch A comprising natural rubber and a CRX2125 filler is produced in the liquid phase according to the process described in U.S. Pat. No. 6,048,923.

Thus, a masterbatch is prepared, according to the protocol explained in detail in the aforementioned patent, from carbon black covered by CRX2125 silica sold by Cabot Corporation, and natural rubber field latex originating from Malaysia and having a rubber solids content of 28% and an ammonia content of 0.3%.

A masterbatch A of natural rubber and CRX2125 filler is thus obtained in which the content of carbon black is 50 phr.

The compounding process used for the different compositions is as follows.

The following tests are performed in the following manner: an internal mixer, filled to 70%, and the initial vessel temperature of which is around 90° C., is charged with the masterbatch A for the compositions TA and CA (or the natural rubber in solid form and the reinforcing filler for the compositions TM), followed, after kneading for one to two minutes, by the various other ingredients, with the exception of the vulcanization system. Thermomechanical working (non-productive phase) is then performed in one step (total kneading time equal to about 5 min), until a maximum "dropping" temperature of about 165° C. is reached.

The mixture thus obtained is recovered and cooled and then the vulcanization system (sulfur and sulfenamide accelerator) are added in an external mixer (homofinisher) at 70° C., by compounding everything (productive phase) for around 5 to 6 min. When a covering agent is present, this covering agent may also be introduced into the external mixer instead of being introduced into the internal mixer.

The compositions thus obtained are subsequently calendered, either in the form of slabs (thickness of 2 to 3 mm) or of thin sheets of rubber, for the measurement of their physical or mechanical properties, or in the form of profiled elements which can be used directly, after cutting and/or assembling to the desired dimensions, for example as semi-finished products for tires, in particular as tire treads.

Trials

The purpose of these tests is to demonstrate the significantly improved reinforcing properties of a composition in accordance with the disclosure, compared to control compositions not in accordance with the disclosure, due to their formulation (presence of coupling agent) and/or their preparation process.

The rubber compositions TM1 to TM3 are thus prepared "in bulk" and the compositions TA1 and CA1 are prepared from the masterbatch A; they differ from one another as follows:
- composition TM1, not in accordance with the disclosure, comprises a blend of carbon black and of silica as reinforcing agent, and a coupling agent,
- composition TM2, not in accordance with the disclosure, comprises black covered by silica as reinforcing agent, and a coupling agent,
- composition TM3, not in accordance with the disclosure, is identical to composition TM2, with the exception of the coupling agent, of which it is devoid,
- composition TA1, not in accordance with the disclosure, comprises carbon black covered by silica as reinforcing agent, and a coupling agent,
- composition CA1, in accordance with the disclosure, comprises carbon black covered by silica as reinforcing agent but does not comprise a coupling agent.

The constituents of the compositions TM1 to TM3, TA1 and CA1 are presented in the following Table 1, in which the contents are indicated as parts by weight per hundred parts of elastomer, phr.

TABLE 1

| | Composition | | | | |
|---|---|---|---|---|---|
| | TM1 | TM2 | TM3 | TA1 | CA1 |
| Natural rubber | 100 | 100 | 100 | 100 | 100 |
| Carbon black (1) | 35 | — | — | — | — |
| Silica (2) | 15 | — | — | — | — |
| Black covered by silica (3) | — | 50 | 50 | 50 | 50 |

TABLE 1-continued

| | Composition | | | | |
|---|---|---|---|---|---|
| | TM1 | TM2 | TM3 | TA1 | CA1 |
| Coupling agent (4) | 1 | 1 | — | 1 | — |
| Antioxidant (5) | 1.5 | 1.5 | 1.5 | 1.5 | 1.5 |
| Paraffin | 1 | 1 | 1 | 1 | 1 |
| Stearic acid | 1 | 1 | 1 | 1 | 1 |
| ZnO (6) | 2.7 | 2.7 | 2.7 | 2.7 | 2.7 |
| CBS (7) | 1.7 | 1.7 | 1.7 | 1.7 | 1.7 |
| Sulfur | 1.2 | 1.2 | 1.2 | 1.2 | 1.2 |

(1) N234 sold by Cabot Corporation
(2) Ultrasil 7000 precipitated silica, sold by Evonik
(3) CRX2125 sold by Cabot Corporation
(4) bis(3-triethoxysilylpropyl) tetrasulfide, TESPT, SI69, sold by Evonik
(5) N-(1,3-Dimethylbutyl)-N-phenyl-para-phenylenediamine, Santoflex 6-PPD, sold by Flexsys
(6) Industrial grade zinc oxide, sold by Umicore
(7) N-cyclohexyl-2-benzothiazolesulfenamide, Santocure CBS, sold by Flexsys The properties measured for these compositions after curing at 150° C. for 40 minutes are given in Table 2 below.

TABLE 2

| Properties after curing | Composition | | | | |
|---|---|---|---|---|---|
| | TM1 | TM2 | TM3 | TA1 | CA1 |
| Z value | 72 | 37 | 37 | 78 | 82 |
| MA300 | 2.13 | 2.66 | 2.24 | 2.74 | 2.86 |
| MA300/MA100 | 1.13 | 1.27 | 1.22 | 1.70 | 1.60 |
| Tan$\delta_{max\ return}$ | 0.12 | 0.09 | 0.09 | 0.09 | 0.08 |

It is observed, as expected, that the compositions TA1 and CA1 prepared from a masterbatch A produced in the liquid phase have a greatly improved dispersion of the filler in the elastomeric matrix compared to those of the compositions prepared in bulk, TM. (The difference is less pronounced with the composition TM1 comprising carbon black and silica which represents, as is known to those skilled in the art, a blend of fillers which is easier to process than carbon blacks covered by silicas).

On the contrary, it is observed, very surprisingly, that the composition in accordance with the disclosure CA1 has a reinforcement (MA300 and MA300/MA100 values) which is virtually identical to that of the composition TA1 which includes a coupling agent and which is significantly better than the reinforcing properties of the 3 control compositions TM1 to TM3. This observation is all the more surprising in that it appears clearly, in light of compositions TM2 and TM3, that the absence of a coupling agent has a significant negative impact on the reinforcing properties of the composition devoid of coupling agent (TM3).

Moreover, it is also quite astonishingly observed that the composition CA1 in accordance with the disclosure has a hysteresis (Tan $\delta_{max\ return}$ value) which is improved compared to the composition TA1 itself.

Thus, an unexpected effect has been shown of the combination of a filler covered by silica with the very good dispersion of the composition, which makes it possible to do away with the presence of an additional coupling agent.

The invention claimed is:

1. A rubber composition based on at least one diene elastomer, a reinforcing filler predominantly comprising a filler covered at least partially by silica and a crosslinking system, wherein a dispersion of the filler in an elastomeric matrix including the at least one diene elastomer has a Z score greater than or equal to 70 and wherein the composition is devoid of agent for coupling the filler with the at least one diene elastomer.

2. The composition according to claim 1, the filler covered at least partially by silica selected from the group consisting of carbon black, metal hydroxides, and crosslinked polymer particles.

3. The composition according to claim 2, in which the filler at least partially covered by silica consists of carbon black.

4. The composition according to claim 1, in which the filler covered at least partially by silica represents more than 60% by weight of the reinforcing filler.

5. The composition according to claim 3, in which the carbon black covered at least partially by silica is used at a content ranging from 30 to 90 phr.

6. The composition according to claim 1, in which the filler covered at least partially by silica is used in a blend with carbon black.

7. The composition according to claim 1, in which the filler covered at least partially by silica is used in a blend with silica.

8. The composition according to claim 6, in which the total content of reinforcing filler of the composition varies from 35 to 75 phr, and the content of carbon black or of silica varying from 1 to 35 phr.

9. The composition according to claim 1, in which the filler covered at least partially by silica represents more than 90% by weight of the reinforcing filler.

10. The composition according to claim 1, in which the filler covered at least partially by silica is the only reinforcing filler of the composition.

11. The composition according to claim 1, in which the diene elastomer is selected from the group consisting of polybutadienes, natural rubber, synthetic polyisoprenes, butadiene copolymers, isoprene copolymers and mixtures of these elastomers.

12. The composition according to claim 11, in which the diene elastomer is a natural rubber.

13. The composition according to claim 1, which comprises less than 15 phr of plasticizing agents.

14. A finished or semi-finished article comprising the composition according to claim 1.

15. A tire tread comprising the composition according to claim 1.

16. A tire or semi-finished product comprising the composition according to claim 1.

* * * * *